United States Patent [19]
Osborn

[11] 3,803,491
[45] Apr. 9, 1974

[54] COMMUNICATIONS SYSTEM

[75] Inventor: William Osborn, Dallas, Tex.

[73] Assignee: Tocom, Inc., Irving, Tex.

[22] Filed: Jan. 26, 1972

[21] Appl. No.: 220,984

Related U.S. Application Data

[63] Continuation-in-part of Ser. No. 146,865, May 26, 1971.

[52] U.S. Cl. .............. 325/53, 178/DIG. 13, 325/31, 325/55, 325/308

[51] Int. Cl. .......................... H04b 1/00, H04b 7/00

[58] Field of Search ........... 325/31, 51, 53, 55, 308; 178/5.1, DIG. 9, 13; 179/2 AS; 235/51

[56] References Cited

UNITED STATES PATENTS

| | | | |
|---|---|---|---|
| 3,387,082 | 6/1968 | Farber | 179/2 AS |
| 3,668,307 | 6/1972 | Face et al. | 178/DIG. 13 |
| 3,058,065 | 10/1962 | Freeman et al. | 325/31 |
| 3,566,384 | 2/1971 | Smith et al. | 325/31 |

OTHER PUBLICATIONS

"Two-Way Applications for Cable Television in the 70's." IEEE Spectrum Applications Report, Ronald K. Jurgen, Author, Pages 39–54.

*Primary Examiner*—Benedict V. Safourek
*Assistant Examiner*—Marc E. Bookbinder
*Attorney, Agent, or Firm*—Clegg & Cantrell

[57] ABSTRACT

A number of different remote units are interrogated and controlled by signals transmitted thereto from a master station. The transmitted interrogation and control signals take the form of three radio-frequency signals at three different frequencies. Each radio-frequency signal is coded in a binary manner by turning same off and on. Timewise, the parallel interrogation and control signals are serially divided into successive frame periods wherein each frame period may include a remote unit identification code interval, a remote unit control code interval, a remote unit function selector code interval and a data readout control interval. Each remote unit includes a number of data transducer mechanisms and control mechanisms and a transmitter mechanism for transmitting reply signals back to the master station. Each remote unit further includes an identification decoder for recognizing the occurrence of its own individual identification number during an identification code interval and enabling its transmitter mechanism to transmit data signals during the readout interval following such occurrence. Each remote unit also includes a function selector decoder for responding to word count signals transmitted during the function selector code interval for selecting and enabling a particular one of the various data transducer mechanisms associated therewith. Each remote unit further includes a data readout mechanism responsive to coded readout signals transmitted during the data readout control interval for producing a serial binary data signal representative of the data condition of the selected data transducer mechanism and supplying same to the transmitter mechanism. Each remote unit may also include a control code decoder for responding to a control word transmitted during the control code interval for selecting and enabling a particular one of the control mechanisms corresponding to the control word.

When used in connection with a community antenna or cable television system a remote unit is located in or adjacent each of the home viewer television receivers which is coupled to the cable system. In such CATV application, the data transducer mechanisms may include fire and burglar alarm mechanisms, various water meter, gas meter and electric meter reading mechanisms, various program rating and viewer response mechanisms and the like. The control mechanisms may include motors, solenoids, relays, etc. which control air conditioning systems, heating systems, lawn sprinkler systems, community disaster alert systems and the like.

22 Claims, 11 Drawing Figures

SIGNAL FORMAT

| INTERVAL | FUNCTION | EXTERNAL SIGNALS | INTERNAL SIGNALS |
|---|---|---|---|
| I | MASTER RESET PULSE | $f_1$ $\bar{f}_2$ $\bar{f}_3$ | |
| II | WORD COUNT PULSE | $f_1$ $f_2$ $\bar{f}_3$ | |
| III | I D CLOCK PULSES | $f_1$ $f_3$ | I D ARM |
| III | I D "ONE" SIGNAL | $f_2$ $f_3$ | I D ARM |
| III | I D "ZERO" SIGNAL | $\bar{f}_2$ $f_3$ | I D ARM |
| IV | WORD COUNT PULSE | $f_1$ $f_2$ $\bar{f}_3$ | |
| V | CONTROL CLOCK PULSES | $f_1$ $f_3$ | CONTROL ARM |
| V | CONTROL "ONE" SIGNAL | $f_2$ $f_3$ | CONTROL ARM |
| V | CONTROL "ZERO" SIGNAL | $\bar{f}_2$ $f_3$ | CONTROL ARM |
| VI | WORD COUNT PULSES | $f_1$ $f_2$ $\bar{f}_3$ | |
| VII | DATA READOUT CLOCK | $f_1$ $f_2$ $f_3$ | $\overline{\text{I D ARM}}$ OR $\overline{\text{CONTROL ARM}}$ |

FIG. 3

WORD AND BIT FORMAT

READOUT BIT NUMBER

| WORD NO. | 1 | 2 | 3 | 4 | 5 | 6 | 7 | 8 | 9 | 10 | 11 | 12 | 13 | 14 | 15 | 16 | FUNCTION |
|---|---|---|---|---|---|---|---|---|---|---|---|---|---|---|---|---|---|
| 1 | F | A | P | on off | yes | no | no op | X | A | B | C | D | E | Pay | X | Monitor | ALARM, OPINION, RATING, MONITOR |
| 2 | X | X | X | X | X | X | X | X | X | X | X | X | X | X | X | X | SPARE |
| 3 | X | X | X | X | X | X | X | X | X | X | X | X | X | X | X | X | SPARE |
| 4 | 1 | 2 | 4 | 8 | 1 | 2 | 4 | 8 | 1 | 2 | 4 | 8 | 1 | 2 | 4 | 8 | WATER METER (BCD) |
| 5 | 1 | 2 | 4 | 8 | 1 | 2 | 4 | 8 | 1 | 2 | 4 | 8 | 1 | 2 | 4 | 8 | GAS METER (BCD) |
| 6 | 1 | 2 | 4 | 8 | 1 | 2 | 4 | 8 | 1 | 2 | 4 | 8 | 1 | 2 | 4 | 8 | ELECTRIC METER (BCD) |
| 7 | 1 | 2 | 4 | 8 | 1 | 2 | 4 | 8 | 1 | 2 | 4 | 8 | 1 | 2 | 4 | 8 | OTHER DATA (BCD) |
| 8 | NONE | | | | | | | | | | | | | | | | RESET OPINION FFs |
| 9 | TEST SIGNALS | | | | | | | | | | | | | | | | SINGLE OSC OFF |
| 10 | TEST SIGNALS | | | | | | | | | | | | | | | | SINGLE OSC ON |
| 11 | TEST SIGNALS | | | | | | | | | | | | | | | | ALL OSC OFF |
| 12 | TEST SIGNALS | | | | | | | | | | | | | | | | ALL OSC ON |
| 13 | C | C | C | C | C | C | C | C | C | C | C | C | C | C | C | C | CONTROL OPERATION CHECK |

FIG. 4

COMMUNICATIONS SYSTEM

This application is a continuation-in-part of my copending application Ser. No. 146,865, filed May 26, 1971 for Communications System.

BACKGROUND OF THE INVENTION

This invention relates to digital-type data communications systems and, while not limited thereto, is particularly useful in connection with a community antenna or cable television signal distribution system.

In cable television systems, the television program signals are distributed to the various subscribers by way of a coaxial cable. While such systems generally perform in a satisfactory manner, it would be desirable to employ the same coaxial cable for transmitting various information and data signals to and from the subscriber's location to the central station or master station from which the television signals are transmitted. The signals transmitted back to the central station might include, for example, fire alarm signals, burglar alarm signals, ambulance summoning signals, water meter, gas meter and electric meter reading signals, program rating signals, viewer response signals, and the like. Television signals generated by a television camera and transmitter located at a subscriber's location might also be transmitted back to the central station for ultimate retransmission from the central station to all subscriber locations. Such a bi-directional cable system would also be useful in connection with pay television for monitoring the usage of television signals by the subscriber and transmitting appropriate billing data signals to an automatic data processor located at the central station. Remote use of computers from the home and narrowband picture telephones are further possible uses. It would also be desirable to employ the cable system for transmitting signals from the central station to the subscriber's station to control the operation of various systems such as air conditioning systems, heating systems, lawn sprinkler systems, etc.

It is an object of the invention, therefore, to provide a new and improved communications system for enabling a master station to selectively interrogate different ones of a large number of remote units for causing each selected remote unit to transmit various information and data signals back to the master station.

It is another object of the invention to provide a new and improved communications system for enabling a master station to selectively control various operating functions at each of several different remote locations.

It is also an object of the invention to provide a new and improved communications system in which television signals may be transmitted from various ones of a number of remote locations to a master station and then retransmitted from the master station to all remote locations.

It is a further object of the invention to provide a new and improved communications system which is particularly useful in connection with a cable television (CATV) system for enabling bi-directional flow of information between the central programming station and the various remote subscriber units.

For a better understanding of the present invention, together with other and further objects and features thereof, referecne is had to the following description taken in connection with the accompanying drawings, the scope of the invention being pointed out in the appended claims.

BRIEF DESCRIPTION OF THE DRAWINGS

Referring to the drawings:

FIGS. 3 and 4 are charts used in explaining the operation of the FIG. 2 remote unit;

DESCRIPTION OF THE ILLUSTRATED EMBODIMENT

Figure 1:
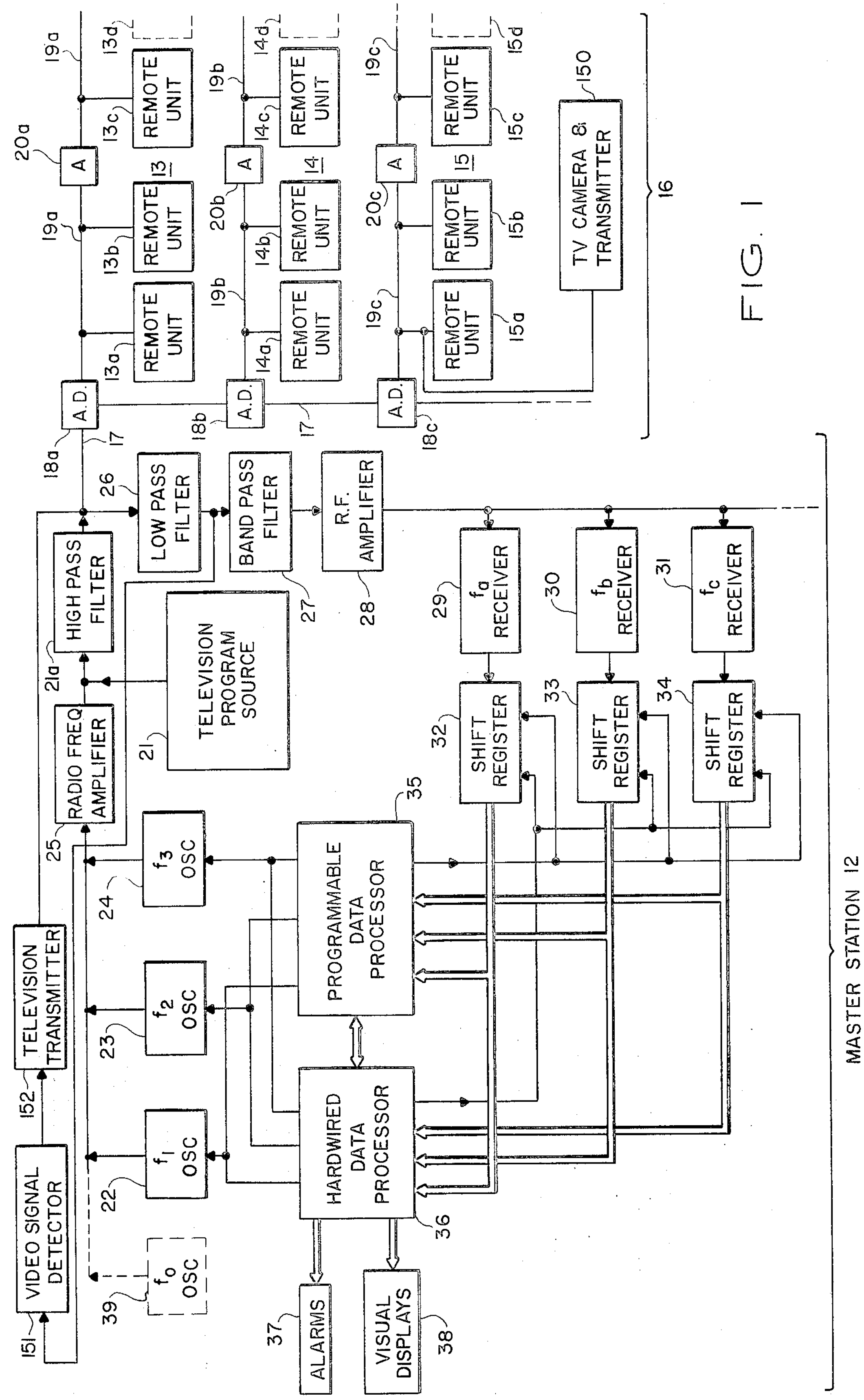
FIG. 1 is an overall system block diagram of a representative embodiment of the present invention as applied to the case of a cable television system and, as such, shows the general features of the master programing station and the connection of typical ones of the remote subscriber units to the cable distribution system.

Referring to FIG. 1, there is shown a master station 12 connected to a number of remote subscriber units 13*a*, 13*b*, 13*c*, etc., 14*a*, 14*b*, 14*c*, etc., 15*a*, 15*b*, 15*c*, etc., by way of a coaxial cable network or signal distribution system indicated generally at 16. Cable distribution system 16 includes a coaxial type trunk cable 17 having various bi-directional trunk amplifier and distribution units 18*a*, 18*b*, 18*c*, etc., connected at spaced points therealong. Coaxial type feeder cables 19*a*, 19*b*, 19*c*, etc., extend outwardly from respective ones of the amplifier and distribution units 18*a*, 18*b*, 18*c*, etc. Remote units in group 13 (13*a*, 13*b*, 13*c*, etc.) are connected to feeder cable 19*a*, while remote units in group 14 are connected to feeder cable 19*b* and remote units in group 15 are connected to feeder cable 19*c*. Various bi-directional amplifiers 20*a*, 20*b*, 20*c*, etc., are located at spaced points along feeder cables 19*a*, 19*b*, 19*c*, etc., respectively.

As will be seen, each remote unit includes a television receiver, a television signal converter and a data transmission system. The data transmitters in the remote units in group 13 are constructed to transmit data back to the master station 12 by means of a radio-frequency signal at a first frequency of, for example, 10 magahertz. The data transmitters in the group 14 remote units employ a radio-frequency signal at a second frequency of, for example, 12 megahertz, while the data transmitters in the group 15 remote units employ a radio-frequency signal at a third frequency of, for example, 14 megahertz. Additional remote unit groups would employ radio-frequency signals at additional frequencies in, for example, the 5 to 30 megahertz range. The system is constructed so that each remote unit group, for example, group 13 connected to feeder cable 19*a*, can include as many as 999 individual remote units, there being as many bi-directional amplifiers 20*a* spaced along cable 19*a* as are necessary to maintain the desired signal strength and quality.

The master station 12 includes a television program source or transmitter 21 for transmitting television signals for the desired number of television channels (e.g., 36 channels) by way of a high-pass filter 21*a* and the coaxial cable distribution system 16 to each of the various remote subscriber units connected thereto. Such television signals may fall within, for example, a 50 to 300 magahertz frequency range. The master station 12 further includes interrogation and control signal transmitter circuits for interrogating the remote units and for controlling various operating functions thereat, data receiving circuits for receiving reply signals from the remote units and data processing equipment for controlling the transmitting circuits and receiving circuits and processing the reply data received by the latter. The interrogation and control signal transmitter circuits include a set of three oscillator circuits 22, 23 and 24 for simultaneously generating radio-frequency signals at three different frequencies designated as $f_1$, $f_2$ and $f_3$. Frequencies $f_1$, $f_2$ and $f_3$ may be, for example, 41, 45 and 48 megahertz, respectively. These interrogation and control signals are applied by way of a radio-frequency amplifier 25 and the high-pass filter 21*a* to the cable distribution system 16. Amplifier 25 should be capable of handling frequencies in the 40 to 50 megahertz range, while high-pass filter 21*a* should be capable of passing signals of 40 megahertz and higher.

The three frequencies could alternatively be generated by transmitting a carrier signal $f_0$ (generated by oscillator circuit 39) of, for example, 50 megahertz along with modulated signals $f_1$, $f_2$ and $f_3$ (generated respectively by oscillator circuits 22, 23 and 24) of, for example, 50.445, 50.700 and 50.800 megahertz respectively. In this case, of course, the amplifier 25 would have to be capable of handling the four frequencies in question.

The data signal receiving portion of the master station 12 includes a low-pass filter 26, a band-pass filter 27 and a radio-frequency amplifier 28. Filters 26 and 27 are constructed so as to pass through to the amplifier 28 only frequencies falling within the frequency band used by the data transmitters in the different remote units. As such, low-pass amplifier 26 may be constructed to pass, for example, frequencies of 30 megahertz and less, while band-pass filter 27 is constructed to pass frequencies in the 5 to 30 megahertz frequency range. The output signals appearing at the output of radio-frequency amplifier 28 are supplied to the inputs of radio receivers 29, 30 and 31. Receiver 29 is tuned to a frequency $f_a$ corresponding to the frequency for the remote unit data transmitters connected, for example, to feeder cable 19*a* (e.g., 10 megahertz). Receiver 30 is tuned to a frequency $f_b$ corresponding to the frequency of the remote unit data transmitters connected, for example, to feeder cable 19*b* (e.g., 12 megahertz). Receiver 31 is tuned to a frequency $f_c$ corresponding to the frequency of the remote unit data transmitters connected, for example, to feeder cable 19*c* (e.g., 14 megahertz).

The detected signals appearing at the outputs of receivers 29, 30 and 31 are in the form of serial digital data signals and are shifted into shift registers 32, 33 and 34, respectively, in a serial manner. The data signals stored in shift registers 32, 33 and 34 are periodically transferred in a parallel manner to both a programable data processor 35 (such as an Interdata Model 70) and a hardwired data processor 36. Data processors 35 and 36 control the readin and readout operations of the shift registers 32, 33 and 34. Data processors 35 and 36 also function as modulator mechanisms for controlling or modulating the operation of interrogation and control signal oscillators 22, 23 and 24 in a manner which is coordinated or synchronized with the operation of the shift registers 32, 33 and 34. More particularly, data processors 35 and 36 serve to selectively enable and disable each of the oscillators 22, 23 and 24 so as to turn on and turn off the radio-frequency interrogation and control signals therefrom in a digital manner. Alarms 37 and visual displays 38 are connected to the hardwired data processor 36 for advising a human operator stationed at the master station 12 of various conditions that may occur in different ones of the remote units. Programable data processor 35 may be programed to provide automatic billing for utility companies automatic tabulation of television viewer program ratings and the like.

Figure 2:
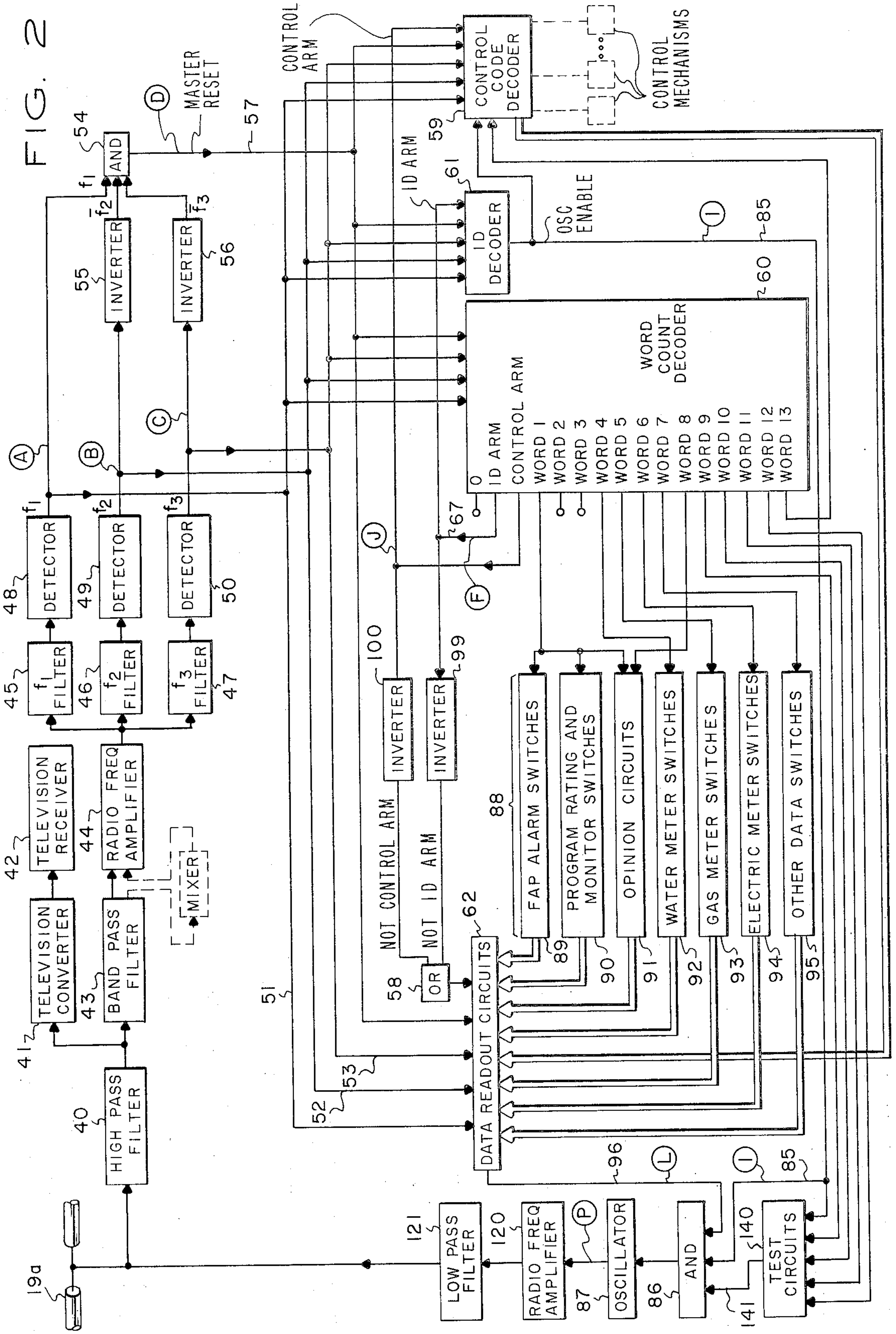
FIG. 2 is a general block diagram showing in greater detail the construction of an individual one of the remote subscriber units of FIG. 1.

Referring now to FIG. 2, there is shown a more detailed block diagram for an individual one of the remote units of FIG. 1. For sake of an example, it will be assumed that the remote unit shown in FIG. 2 is the remote unit 13*a* of FIG. 1. Television program signals transmitted by the television transmitter 21 of FIG. 1 are taken from the coaxial feeder cable 19*a* and supplied by way of a high-pass filter 40 and a television signal converter 41 to a television receiver 42. Television receiver 42 produces television pictures and sound in the usual manner. Television converter 41 includes a channel selector mechanism for selecting the television channel to be viewed and converts the transmitted channel carriers to the appropriate frequencies required by the television receiver 42. As such, converter 41 may be constructed to handle signals in, for example, the 50 to 300 megahertz range. High-pass filter 40 is constructed to pass frequencies of 40 megahertz and higher.

Television program source or transmitter 21, cable distribution system 16 (of FIG. 1), television converter 41 and television receiver 42 (of FIG. 2) constitute the conventional parts of a community antenna television (CATV) system. The remainder of FIG. 2 is not conventional and, as such, constitutes the data transmitter and control function portion of the remote unit 13*a.* And, of course, this portion may be utilized independently of the program source 21, television converter 41 and television receiver 42.

The data transmitter and control function portion of FIG. 2 includes a band-pass filter 43 and a radio-frequency amplifier 44 connected in cascade with the high-pass filter 40. The output of amplifier 44 is connected to frequency selective detector means responsive to the received master station interrogation signals for producing control signals in accordance with the modulation thereof. More particularly, the output of amplifier 44 is connected to the inputs of three individual filters 45, 46 and 47, the outputs of which are connected to respective ones of detectors 48, 49 and 50. Filter 45 is sharply tuned to the same frequency $f_1$, as is the interrogation signal oscillator 22 at the master station 12, such frequency being, for example, 41 megahertz. Filter 46 is sharply tuned to the same frequency $f_2$ as is the second interrogation signal oscillator 23 at the master station 12, such frequency being, for example, 45 megahertz. Filter 47 is sharply tuned to the same frequency $f_3$ as is the third oscillator 24 in the master station 12, such frequency being, for example, 48 megahertz. Thus, the detected control signals appearing at the outputs of detectors 48, 49 and 50 correspond to the binary signals used to modulate the master station oscillators 22, 23 and 24, respectively. Portions of typical waveforms for these detected $f_1$, $f_2$ and $f_3$ signals are represented by waveforms A, B and C, respectively, of FIG. 5. These detected $f_1$, $f_2$ and $f_3$ control signals are supplied by way of bus lines 51, 52 and 53, respectively, to various circuits to be considered hereinafter.

If the alternative scheme for generating the frequencies $f_1$, $f_2$ and $f_3$ were utilized, i.e. generating a carrier frequency $f_0$ along with three modulating frequencies $f_1$, $f_2$ and $f_3$, then a mixer circuit would be connected in cascade between the band-pass filter 43 and radio-frequency amplifier 44 to generate the difference frequencies $f_1$-$f_0$, $f_2$-$f_0$, and $f_3$-$f_0$. The filters 45, 46 and 47 would then be tuned each to a different one of these difference frequencies.

The code format for the $f_1$, $f_2$ and $f_3$ interrogation signals is indicated in the chart of FIG. 3. As they are indicated, the first function of these control signals is to generate a master reset pulse. This pulse is generated during interval I of each of the successive frame periods (see FIG. 5). This is accomplished by supplying the $f_1$ signal directly to the first input of an AND circuit 54 and by supplying the $f_2$ and $f_3$ signals by way of inverters 55 and 56, respectively, to second and third inputs of the AND circuit 54. As indicated in the chart of FIG. 3, a master reset pulse is generated whenever $f_1$ is present and $f_2$ and $f_3$ are not present. The waveform for the master reset pulse train is represented by waveform D of FIG. 5, such master reset pulses being supplied by way of bus line 57 to the various units to be considered hereinafter.

Figure 5:
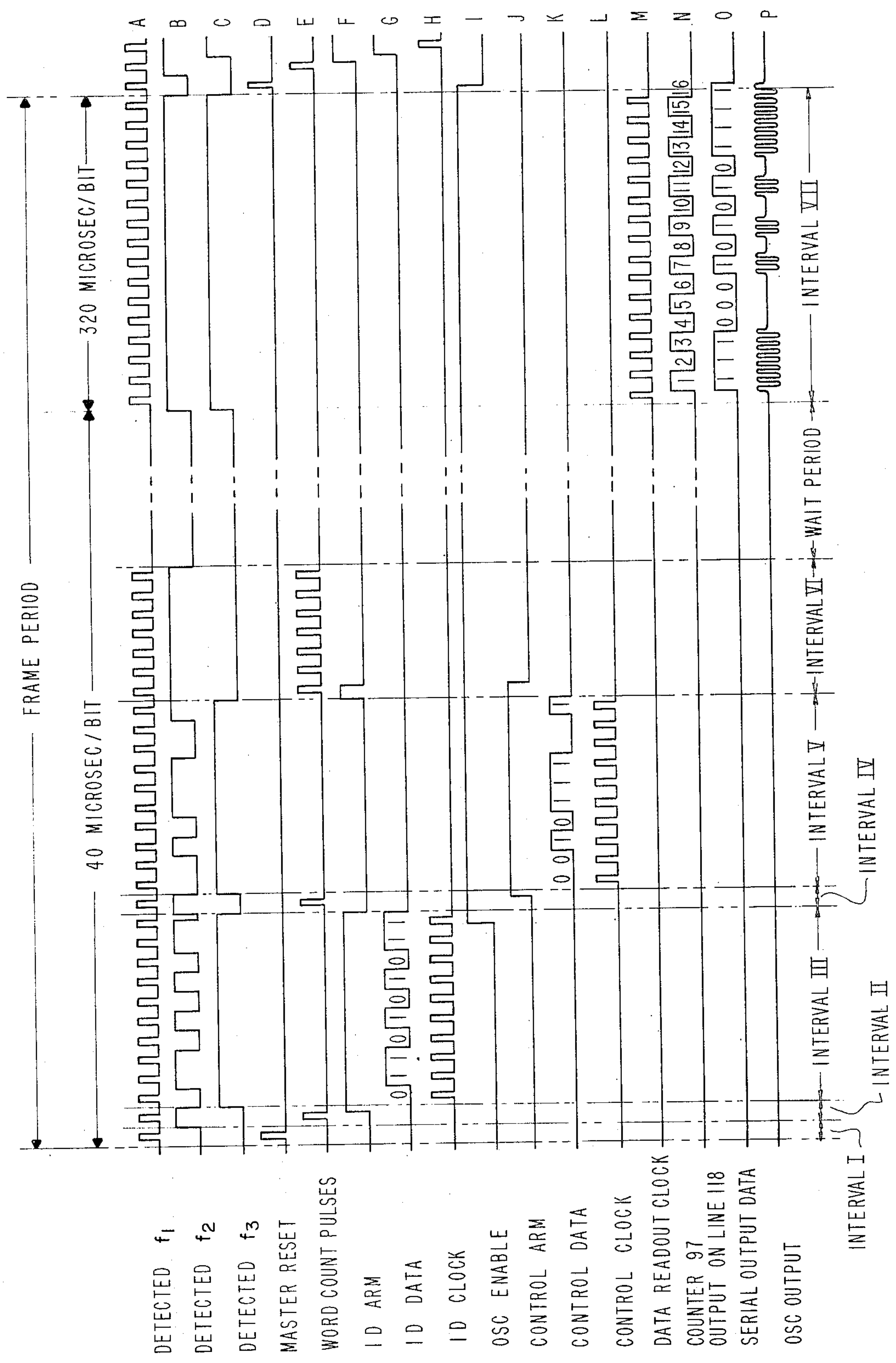
FIG. 5 is a timing diagram showing portions of typical signal waveforms developed at different points in the FIG. 2 remote unit.

Referring now to FIG. 5, it is there intended to be represented that the parallel interrogation signals $f_1$, $f_2$ and $f_3$ transmitted by the master station 12 are coded so as to provide a continuous procession of successive frame periods, one such frame period being shown in FIG. 5. As further indicated in FIG. 5, each frame period can, for convenience, be thought of as being subdivided into seven time intervals designated as I, II, III, IV, V, VI and VII. As will be better appreciated hereinafter, the $f_1$ interrogation signal is in the nature of a continuous train of clock pulses. By way of example only, the pulse rate of the detected $f_1$ pulses may be one megahertz or higher in which case the time spacing between leading edges of neighboring pulses is one microsecond or less. The time spacing shown in FIG. 5 is 40 microseconds per bit for the data transmitted or generated in intervals I through IV and 320 microseconds per bit for the data transmitted in interval VII. The reason for the change in data rate in interval VII concerns the possible wide variation in distances of the remote units from the master station and will be discussed later.

The master reset pulse (waveform D) is generated during interval I. This resets a pulse counter in a function selector or word count decoder 60, a shift register in an identification (I.D.) decoder 61, a shift register in a control code decoder 59, and a pulse counter in data readout circuits 62.

During interval II, the $f_1$, $f_2$ and $f_3$ signals act to generate a single word count pulse (waveform E) which serves to advance the function selector or word count decoder 60 to an "ID arm" condition. This can be better seen by reference to FIG. 6 which shows the word count decoder 60 in greater detail. As there is shown, decoder 60 includes a 4-bit binary pulse counter 63 which drives a 4-line to 16-line decoder 64 (only 15 output lines of which are shown). When counter 63 is reset, the zero output line of decoder 64 is activated. The first count thereafter activates the "ID arm" line, the second count thereafter activates the "control arm" output line, the third count activates the "word one" output line, etc., only one output line at a time being activated. The word count pulses (waveform E) which drive the counter 63 are derived by means of logic circuit means represented by AND circuit 65 and inverter circuit 66. A word count pulse appears at the output of AND circuit 65 whenever $f_1$ and $f_2$ are present and $f_3$ is not present. In terms of the waveforms of FIG. 5, a signal is considered to be present when the waveform is at the binary one level (higher level) and not present when the waveform is at the binary zero level (the lower level).

Figure 6:
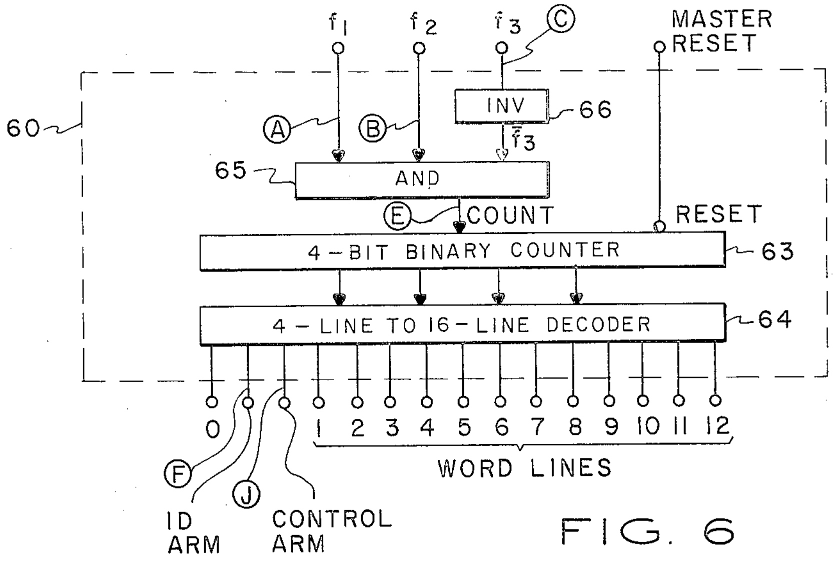
FIG. 6 is a more detailed block diagram of a function selector decoder used in the FIG. 2 remote unit.

It will be seen by referring back to FIG. 2, that the "ID arm" signal appearing on the "ID arm" output line of counter 64 of FIG. 6 is supplied by way of conductor 67 to the I.D. decoder 61 for purposes of arming the input gates to the shift register therein. The waveform for the "ID arm" signal is represented by waveform F in FIG. 5.

Interval III of the frame period depicted in FIG. 5 is used for purposes of transmitting a 10-bit identification code signal to the remote units. Each remote unit in any given feeder cable group (e.g., group 13 connected to feeder cable 19*a*) has a unique identification number. If the transmitted I.D. number matches the remote unit ID number, then the reply transmitter in that particular remote unit is activated. Otherwise, it remains disabled. Thus, the I.D. code enables the interrogation of a selected one of the remote units connected to the same feeder cable. Note, in passing and with reference to FIG. 1, that a given I.D. number may not only activate a remote unit in group 13 but also at the same time one of the remote units in group 14 and one of the remote units in group 15. The simultaneous reply signals in such case are maintained separated because the remote unit transmitters on the different feeder cables 19*a*, 199*b* and 19*c* are operating 19 different frequencies, which frequencies are selectively and separately processed by the different receivers 29, 30 and 31 at the master station 12.

Figure 7:
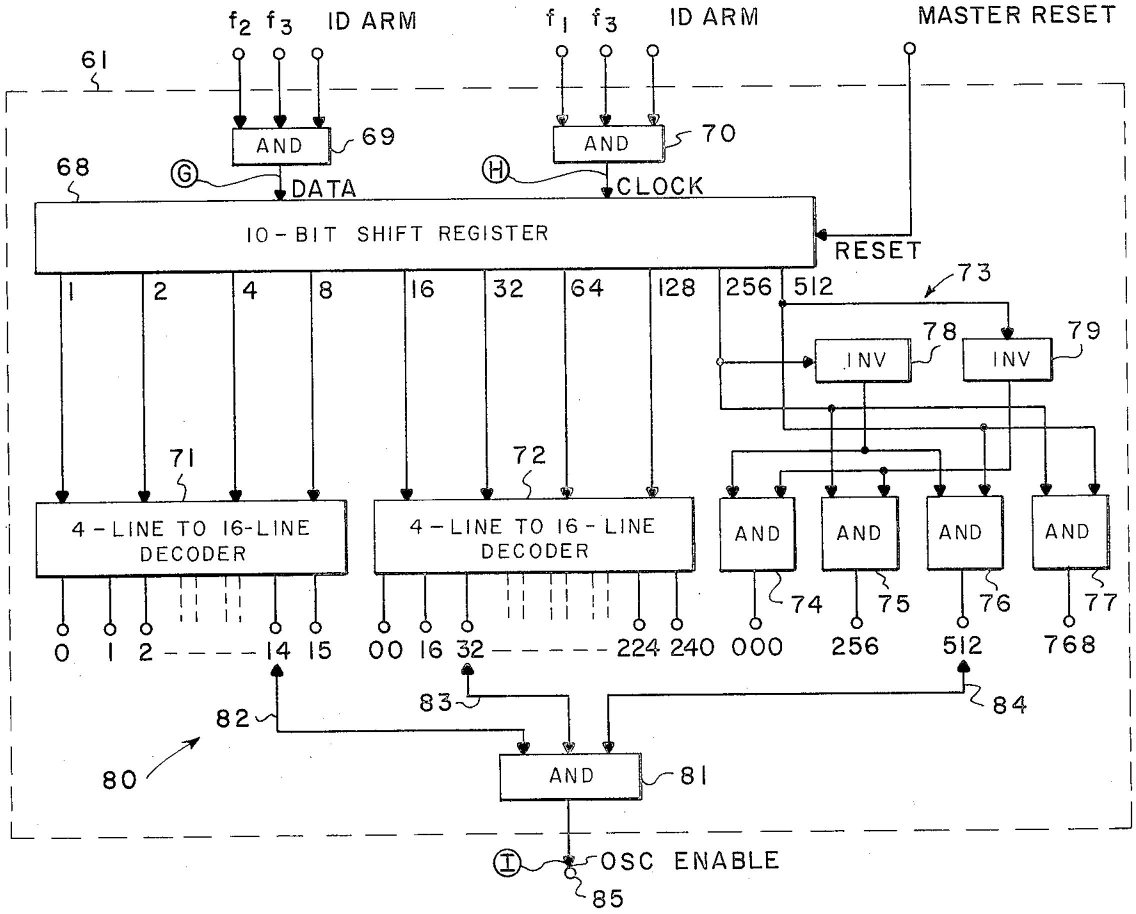
FIG. 7 is a more detailed block diagram of an identification decoder unit used in the FIG. 2 remote unit.

Referring now to FIG. 7, there is shown in greater detail the construction of the ID decoder 61 of FIG. 2. As seen in FIG. 7, the ID decoder 61 includes a 10-bit shift register 68 which is initially cleared or reset to zero by the master reset pulse. Data is read into the shift register 68 in a serial manner by way of AND circuit 69. Clock pulses for clocking in the serial data are provided by means of an AND circuit 70. Logic circuits 69 and 70 are activated to supply data pulses and clock pulses to the shift register 68 only when the "ID arm" signal is at the binary one level (word count decoder 60 in "ID arm" position). With reference to the FIG. 3 chart, it is seen that AND circuit 70 produces an output clock pulse whenever the $f_1$ and $f_3$ signals (also "ID arm" signal) are at the binary one level. AND circuit 69, on the other hand, produces a binary one level output only when the $f_2$ and $f_3$ signals (also "ID arm" signal) are at the binary one level. Since the $f_3$ signal is always at the binary one level during interval III, the $f_1$ signal pulses can be thought of as clock pulses and the $f_2$ signals can be thought of as the ID data signals.

The 1, 2, 4 and 8 binary output lines from shift register 68 are connected to a 4-line to 16-line decoder 71, the 16, 32, 64 and 128 binary output lines of shift register 68 are connected to a second 4-line to 16-line decoder 72 and the 256 and 512 binary output lines of shift register 68 are connected to a 2-line to 4-line decoder indicated generally at 73. The 16 output lines from decoder 71 represent decimal values from zero through 15 in increments of one. Only one of these output lines will be activated at the binary one level at any given instant. The 16 output lines from decoder 72 represent decimal values in the range of zero to 240 in increments of 16. Only one of the output lines of decoder 72 will be activated at the binary one level at any given instant. Decoder 73 includes AND circuits 74, 75, 76 and 77 and inverter circuits 78 and 79. The logic is such that the output lines of AND circuits 74–77 represent decimal values in the range of zero to 768 as obtained by counting by increments of 256. The output line of only one of the AND circuits 74–77 will be at the binary one level at any given instant.

ID decoder 61 is provided with the patchboard type interconnection set-up, indicated generally at 80, such that any selected one of the output lines of decoder 71 can be connected to a first input of an AND circuit 81, any selected one of the output lines of decoder 72 can be connected to a second input of the AND circuit 81 and any selected one of the output lines of AND circuit 74–77 can be connected to a third input of the AND circuit 81. These three connections are made by way of conductors 82, 83 and 84, respectively. The resulting decimal value represented by the occurrence of a binary one level at the output of AND circuit 81 is obtained by summing up the decimal values for the three input lines to the AND circuit 81. For the example shown in FIG. 7, a binary one level appears at the output of AND circuit 81 when the decimal value is 558 (14 + 32 + 512). Thus, the number 558 is the ID number for the particular remote unit using the particular patchboard connections shown in FIG. 7. As is apparent, the highest ID number which can be used with the specific set-up shown in 1023. Thus 1023 remote units could be accommodated on each of the feeder cables 19*a*, 19*b*, 19*c*, etc., of FIG. 1 though, for convenience, the actual number of remote units is limited to 999. Also, the system can be expanded to handle a larger number of remote units on the same feeder cable by increasing the size of the shift register 68 and the number or capacity of the decoders 71, 72, and 73.

Assume, for sake of example, that is was decided in advance that the ID decoder 61 of FIG. 7 should recognize the ID code number of 558 and the question was how to connect the connector leads 82–84. This is determined by connecting the lead 84 to the highest output of the decoder 73 which is less than the desired number. This gives the 512 output. The number 512 is then subtracted from the desired ID number, resulting in a difference of 46. The connector lead 83 is then connected to the largest number value output of decoder 72 which is less than the previous difference of 46. This gives the output lead 32 for decoder 72. This decoder 72 value of 32 is then subtracted from the previous difference valve of 46 to give a remainder of 14. The remaining connector lead 82 is then connected to the number value line of decoder 71 which is equal to this final remainder, in this case the number value 14 output line.

Referring to FIG. 2, it is seen that the "oscillator enable" signal (waveform I of FIG. 5) produced at the output of AND circuit 81 of ID decoder 61 is supplied by way of conductor 85 to an AND circuit 86 which controls a remote unit reply signal transmitter or oscillator 87. Note in passing that oscillator 87 is turned on whenever all three input lines to the AND circuit 86 are at the binary one level. Otherwise, oscillator 87 is turned off.

In the next frame period interval, interval IV, a single word count pulse (waveform E) is generated to advance the word count decoder 60 to a "control arm" condition. The manner of advancing the word count decoder 60 was described earlier. As shown in FIG. 2, the "control arm" signal appearing on the "control arm" output line of counter 64 of FIG. 6 is supplied to a control code decoder 59 shown in FIG. 2. The "control arm" signal, represented by waveform J in FIG. 5, arms the input gates to a shift register in the control code decoder 59.

During interval V of the frame period of FIG. 5, a 10-bit control code signal is transmitted to the remote units for the purpose of initiating certain control operations thereat. The control code identifies the feeder cable group (e.g., group 14 connected to feeder cable 19*b*) in which the control operation is to take place and also the particular control operation which is to occur (e.g., turn on an air conditioner, turn off an air conditioner, etc.). The group identification together with the remote unit identification provides for identifying a single remote unit of the entire system at which the control operation is to occur. That is, the group identification specifies the group and the remote unit identification specifies a single remote unit in the group. The manner of utilizing this information to enable initiation of the control operation will be discussed later after the interrogation function has been described.

Referring to FIG. 5, it is seen that in the next frame period interval, namely, interval VI, there are produced a selectable number of word count pulses (waveform E) which are used to advance the pulse counter 63 and decoder 64 in word count decoder 60 to the desired word count condition (FIG. 6). In other words, the occurrence of one word count pulse during interval VI activates the "word one" output line of decoder 60, the occurrence of two word count pulses during interval VI activates the "word two" output line of decoder 60, the occurrence of three word count pulses during interval VI activates the "word three" output line of decoder 60, etc. It is understood, of course, that only one of the output lines of word count decoder 60 is activated (placed at binary one level) at any given instant. The number of word count pulses which are produced during interval VI is determined by the length of time during that interval that the detected $f_3$ signal (output of detector 50 of FIG. 2) is at the binary zero level.

Referring to FIG. 2, it is seen that the word count output lines of decoder 60 are used to control the status of different ones of a group of data transducer mechanisms indicated generally at 88. These data transducer mechanisms 88 include F.A.P. (fire-ambulance-police) alarm switches 89, program rating and monitor switches 90, opinion circuits 91, water meter switches 92, gas meter switches 93, electric meter switches 94 and other data switches 95. The object in the present example is to enable a readout of the data from possibly one or more sets of the switches 89–95 during any given interrogation signal frame period. The switch set from which the readout data is obtained is determined by the particular one of the word output lines of the word count decoder 60 which is activated during the particular frame period in question. Thus, by properly selecting the number of word count pulses transmitted during interval IV of a particular frame period, a particular one or more of these switch sets 89–95 is selected for readout purposes. Assume, for sake of example, that it is desired to obtain a water meter reading during the particular frame period in question. In this case, four word count pulses (waveform E) are generated from received waveforms $f_1$, $f_2$ and $f_3$ during interval VI for purposes of enabling readout of the data condition of the water meter switches 92. The condition of the water meter switches 92 are then sampled during the next frame sub-interval, namely, interval VII, by the data readout circuit 62 to produce a serial type binary signal (waveform 0 of FIG. 5) which is supplied to AND circuit 86 for controlling the oscillator 87 in accordance therewith. Thus, the number of word count pulses during interval VI serves the function of an address code or function selector code for selecting the particular data transducer mechanism which is to be sampled.

Following interval VI and preceding interval VII is a predetermined wait period during which no operations at the remote units take place. This wait period is to allow time for the enabling signals (outputs from word count decoder 60) to reach and enable the transducer mechanisms before commencing the data readout interval VII. By allowing a wait period of, for example, 240 microseconds, enablement of all transducer mechanisms, even those located some distance from the enabling circuitry of the remote unit, should be completed before the readout interval VII begins.

Figure 8:
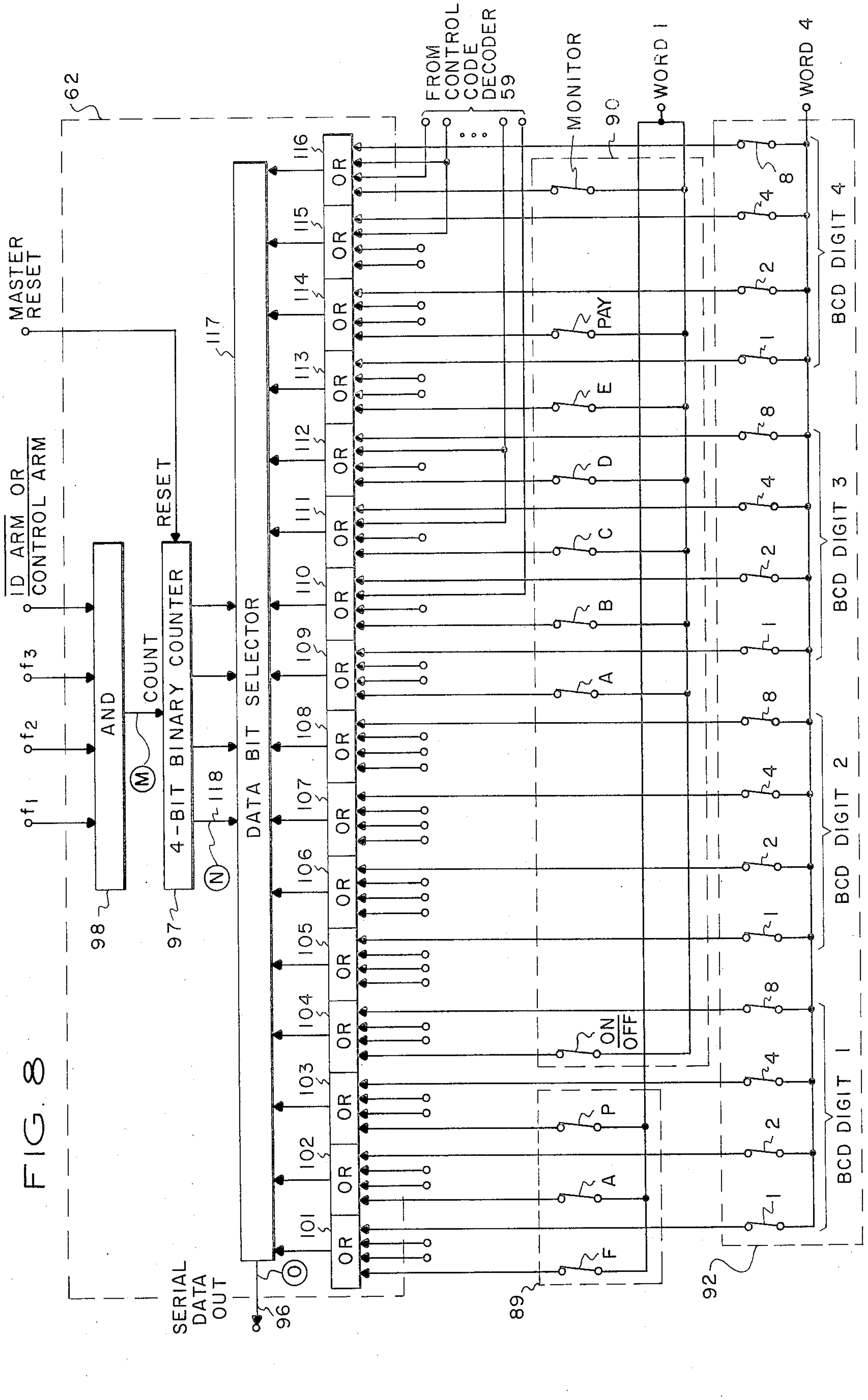
FIG. 8 shows in greater detail the construction of certain data readout circuits and typical ones of various data transducer mechanisms used in the FIG. 2 remote unit.

Referring now to FIG. 8, there is shown in greater detail the construction of the data readout circuits 62 which are operative during interval VII for purposes of generating the data reply signal which is sent back to the master station 12. There is also shown in greater detail in FIG. 8 the construction of the alarm switches 89, the program rating and monitor switches 90 and the water meter switches 92 of FIG. 2, the details of the other switches being omitted for sake of simplicity. The output signal from data readout circuits 62 (on conductor 96) is a serial 16-bit binary signal. Readout is accomplished by supplying a series of 16 data readout clock pulses (waveform M of FIG. 5) to the counting input of a four-bit binary counter 97. These readout clock pulses are obtained by means of an AND type logic circuit 98, to the four inputs of which are respectively applied the $f_1$, $f_2$, $f_3$ and "not ID arm" or "not control arm" signals. The "not ID arm" signal is obtained from an inverter 99 (FIG. 2) and the "not control arm" from an inverter 100, each via an OR circuit 58. The input of the inverter 99 is connected to the "ID arm" output of the word count decoder 60 and the input of the inverter 100 is connected to the "control arm" output thereof. Thus, the "not ID arm" or "not control arm" input of AND circuit 98 is at the binary one level whenever the word count decoder 60 is at any position other than the "ID arm" or "control arm" position. Since the $f_2$ and $f_3$ signals remain continuously at the binary one level during interval VII, AND circuit 98, in effect, passes 16 of the $f_1$ clock pulses to the counter 97.

The readout bit format for the different words is set forth in the chart of FIG. 4. Assume, for example, that a "word one" readout is selected. As seen from either FIG. 2 or FIGS. 9 and 10, this means that the alarm switches 89, the program rating and monitor switches 90 and the opinion circuits 91 will be enabled for readout purposes by the binary one level signal on the word one output line of word count decoder 60, the remainder of the switch sets 92–95 remaining disabled. The three switches in set 89 and the 8 switches in set 90 are individually connected to different ones of a set of 16 OR circuits 101–116. The binary coding in the present example is such that the closure of a switch in either of the sets 89 or 90 represents a binary one condition, while the open condition represents a binary zero condition. Thus, in effect, a series of binary ones and zeros appear at the outputs of OR circuits 101–116 in accordance with the open and closed conditions of the individual switches in sets 89 and 90.

The outputs of OR circuits 101-116 are sampled one at a time in a sequential manner by a data bit selector 117. Selector 117 is controlled by the pulse counter 97. The output signal appearing on output line 118 of pulse counter 97 is represented by waveform N of FIG. 5. This signal alone does not tell which of the OR gates 101–116 is being sampled at any given instant, but does define the basic sampling intervals, these being indicated by the numerals 1, 2, 3, 4, etc., on waveform N. In this regard, it is noted that the counter 97 counts on the trailing edges of the readout clock pulses (waveform M) supplied to the input thereof. Data bit selector 117 is comprised of 16 sets of multiple input AND circuits each having their outputs connected to the common selector output line 96. One input of each AND circuit in selector 117 is connected to the output of one of the OR gates 101–116, while the other inputs of each AND circuit are connected to the appropriate ones of the output lines of counter 97 in accordance with the particular bit interval during which it is to be activated.

A more or less typical representation of the serial binary output signal from readout circuits 62 (on output line 96) is represented by waveform 0 in FIG. 5. This serial data signal is supplied by way of AND circuit 86 to the oscillator 87 to turn same on when the data signal is at the binary one level and to turn same off when the data signal is at the binary zero level, it being assumed that the other two inputs to the AND circuit 86 are at the binary one level at this time. The corresponding output signal of oscillator 87 is represented by waveform P of FIG. 5. For sake of reliable reception and detection at the master station 12, a minimum of approximately ten cycles of oscillation should be produced by oscillator 87 during each readout bit interval during which it is turned on. The frequency of oscillation may be, for example, 31,250 kilohertz. The output of oscillator 87 is supplied by way of a radio-frequency amplifier 120 and a low-pass filter 121 to the coaxial feeder cable 19a for transmission back to the master station 12. At the master station 12, this serial data signal of $f_a$ frequency bursts is detected by receiver 29 and the detected data signal is read into the shift register 32 and thereafter transferred to the data processors 35 and 36 for the desired data processing. The low-pass filter 121 in FIG. 2 is constructed to pass frequencies of, for example, 30 megahertz or less.

At this point, the reason for providing a transmission rate for interval VII which is different from that for intervals I through VI will be discussed. It is apparent that for a given communication system, some remote units may be located a very short distance from the master station whereas other remote units may be located at rather long distances from the master station. Because of this, the time lapse for sending interrogation signals to the remote units and for receiving reply data therefrom will vary depending upon the distance of the particular remote unit in question from the master station. Since the master station does not "know" the distance of a remote unit from which it is receiving reply data, it is necessary that the master station be able to sample the received reply data in a manner which accounts for variations in round trip transmission times. This is done by providing a longer time duration of data bits in the data readout interval VII (e.g. 320 microseconds per bit) so that the reply data will likewise have the same longer time duration of its data bits. Then sampling the readout data at the master station may be done at some time after the longest expected round trip delay but within a period equal to the shortest expected round trip delay plus the time duration of a reply data bit. For example, if the longest expected round trip delay from the sending of interrogation signals to the receipt of reply data were 440 microseconds and the shortest were 340 microseconds, then for a bit duration time of 320 microseconds, sampling of reply data at the master station could begin 550 microseconds after sending out the interrogation signals with the assurance that the sampling would be done as the first bit of the received reply data was being received, i.e., that the sampling was properly synchronized. If the shortest delay time were encountered, the leading edge of the first bit of the reply data would be received 340 microseconds after the sending of the interrogation signals so that the sampling would occur 110 microseconds before receipt of the trailing edge of this bit and thus at the proper time. If, on the other hand, the longest delay time were encountered, the leading edge of the first bit of the reply data would be received 440 microseconds after the sending of the interrogation signals so that the sampling would occur 210 microseconds before receipt of the trailing edge of this bit and thus again at the proper time.

Referring now to the FIG. 4 chart, it is seen that the alarm switches 89, the program rating and monitor switches 90 and the opinion circuits 91 are sampled during a "word one" interrogation of the remote unit. The F (fire) switch of alarm switch set 89 (FIG. 8) is connected to a fire alarm system located at the location of the remote unit 13*a*. The A (ambulance summoning) switch is a key-operated switch which is closed whenever it is desired by the remote subscriber to call for medical assistance. The P (police) switch may be connected to, for example, a burglar alarm system at the remote location. The "on/off" switch in switch set 90 is ganged to the master on/off switch for the converter 41 and advises the master station of the on/off status of the remote unit television receiver. The program rating switches A-E are ganged to switches in an encoder to the channel selector setting in the television converter 41 (FIG. 2). The encoder and ganging arrangement are described in more detail in co-pending patent application Ser. No. 146,865. In general, however, each setting of the channel selector, whether of the pushbutton or rotary type, causes a different combination of the program rating switches A-E to close. Thus, by sampling the program rating switches 90, it can be determined at the master station 12 which television channel is being watched at any given instant.

It is, of course, possible to provide a separate program rating switch for each channel selector position (rather than encoding the each channel selector position into a five-bit code), but this would generally require more hardware (switches) and the use of additional "word number" bit positions. For example, if there were 36 channel selector positions, then 36 separate program rating switches woud be required as well as the use of 36 "word number" bit positions–such as all the bit positions of word 2 and word 3 (presently unused–see FIG. 4) as well as four-bit positions of word 1.

The "pay" switch in switch set 90 is ganged to a key-operated switch in the television converter 41 which indicates whether the remote unit user is authorized to watch certain "pay T.V." channels and thus is to be billed for the time he is tuned to such channels. This is discussed in more detail in the aforecited copending application.

The "monitor" switch in switch set 90 is set to the closed position manually when the remote unit user becomes a user of the system. This provides a simple check of whether the interrogation process of that remote unit is being carried out properly. For example, if the program rating switches 90 were sampled by the master station and a binary zero signal were present in bit position 16 of the serial output signal, the master station would be apprised that a trouble condition existed at the remote unit.

The x's used in two of the "word one" bit positions and all of the "word two" and "word three" bit positions represent spare or unused bit intervals.

Considering now the water meter switches 92 of FIG. 8, it is noted that such switches are arranged to provide a four-digit binary coded decimal readout representing the water meter reading in gallons of water consumed. The physical connection of the switches to the water meter can be accomplished in several possible ways. One approach would be to employ small analog-to-digital shaft encoders mechanically ganged to the meter dial pointer shafts in the water meter, in which case the switches 92 would represent the contacts on the shaft encoders. A better alternative would be to construct the water meter so that the encoder switch contacts are an integral part of the meter mechanism. Similar considerations apply for the gas and electric meter readout switches.

Figure 9:
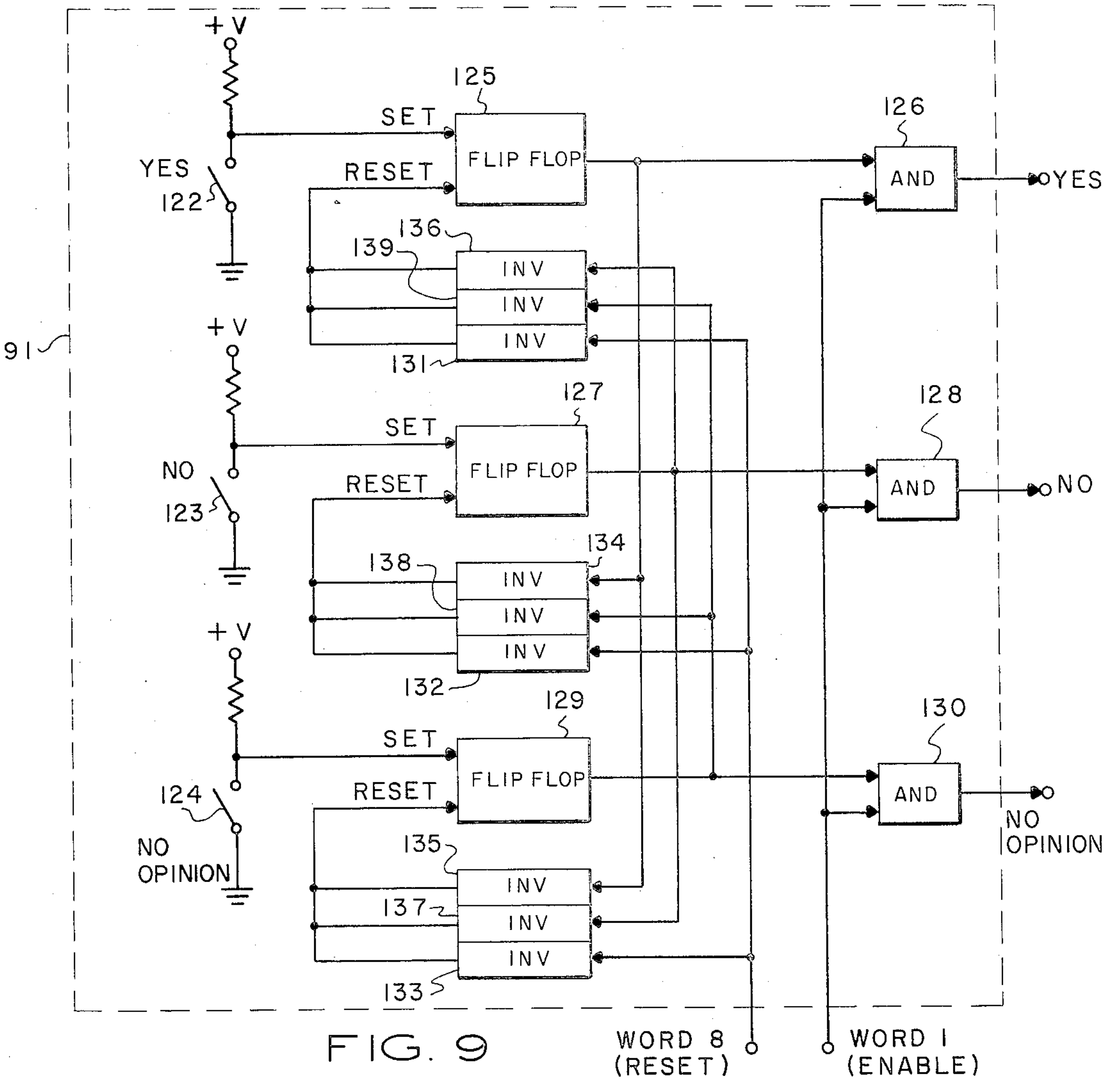
FIG. 9 shows in greater detail the construction of certain viewer response circuits used in the FIG. 2 remote unit.

Referring now to FIG. 9, there is shown in greater detail the viewer opinion or viewer response circuits 91 of FIG. 2. Such circuits comprise a set of three manually operable pushbutton switches 122, 123 and 124 which enable the television viewer to transmit back to the master station 12 his opinion or response with respect to specific questions asked of the viewing audience during the course of a television program. The closing of "yes" switch 122 turns on a flip-flop circuit 125 which drives an AND circuit 126. The closing of "no" switch 123 turns on a flip-flop circuit 127 which drives an AND circuit 128. The closing of a "no opinion" switch 124 turns on a flip-flop circuit 129 which drives an AND circuit 130. In accordance with the FIG. 4 format, the outputs of AND circuits 126, 128 and 130 are connected respectively to OR circuits 105, 106 and 107 shown in FIG. 8. Initially, before a question is asked, each of the flip-flops 125, 127 and 129 is reset to its "off" condition by transmitting a "word eight" signal (eight word count pulses during interval IV) from the master station 12. The resulting "word eight" signal from the word count decoder 60 is supplied by way of inverter circuits 131, 132 and 133 to accomplish the desired resetting. The opinion circuits 91 are further constructed so that only one of the flip-flops 125, 127 and 129 can be turned on any given instant. For example, the turning on of flip-flop circuit 125 causes a reset signal to be produced at the output of inverter circuits 134 and 135 for purposes of resetting flip-flops 127 and 129, if necessary. Similarly, the turning on of flip-flop 127 resets the other flip-flops 125 and 129 by way of inverter circuits 136 and 137. The turning on of the third flip-flop 129 resets the other two flip-flops 125 and 127 by way of inverter circuits 138 and 139. After sufficient time has elapsed for the television viewer to make up his mind and to depress one of the opinion pushbuttons (including time to change his mind and to push a second opinion button), the master station 12 transmits a "word one" signal and the viewer's opinion is transmitted back to the master station during the immediately ensuing data readout interval. The "word one" signal enables the second input of each of the AND circuits 126, 128 and 130, thus allowing a readout of the binary conditions on the first inputs, the outputs of AND circuits 126, 128 and 130 being connected to the data readout circuits 62 as indicated in FIG. 2.

Returning to FIG. 2, each remote unit may further include test circuits 140 for purposes of performing maintenance-type testing of the various remote units. During a period of normal system operation, output line 141 of test circuits 140 remains at the binary one level so as not to interfere with the such normal operation. Test circuits 140 are shown in greater detail in FIG. 10. As there is seen, such circuits include a flip-flop circuit 142 and a pair of two-input AND circuits 143 and 144. The four possible testing functions which can be performed by the test circuits 140 are listed opposite words 9–12 in the FIG. 4 chart. The oscillator 87 in a particular selected remote unit can be turned off by transmitting its particular identification code during interval III and a "word nine" code during interval VI. This turns the flip-flop 142 off, thus placing output line 141 at the binary zero level. The oscillator 87 in a particular remote unit can be turned on by transmitting its particular identification code during interval III and a "word ten" code during interval VI. This turns the flip-flop 142 on and places a binary one level on output line 141. The oscillators in all of the different remote units can be turned off by transmitting the "word eleven" signal during interval VI. Conversely, the oscillators in all of the different remote units can be turned on (more precisely, the flip-flops 142 turned on) by transmitting the "word twelve" signal during interval VI.

It is noted that each of the data transducer mechanisms represented by switch sets 89–95 need not be sampled or interrogated the same number of times. For example, if desired, the program rating and monitor switches 90 can be sampled ten times as often as the water meter switches 92. As a further example, the utility meter switches 92, 93 and 94 may be sampled only once a month if desired.

As indicated earlier, the particular remote unit at which a control operation is to take place is determined by the control code, which specified the cable group in which the operation is to take place, and the identification code which specifies the particular unit in the group at which the operation is to take place. The control code also specifies what control operation is to occur. This information is utilized by the control code decoder 59 to determine if a control operation is to be initiated and, if so, which operation.

Figure 11:
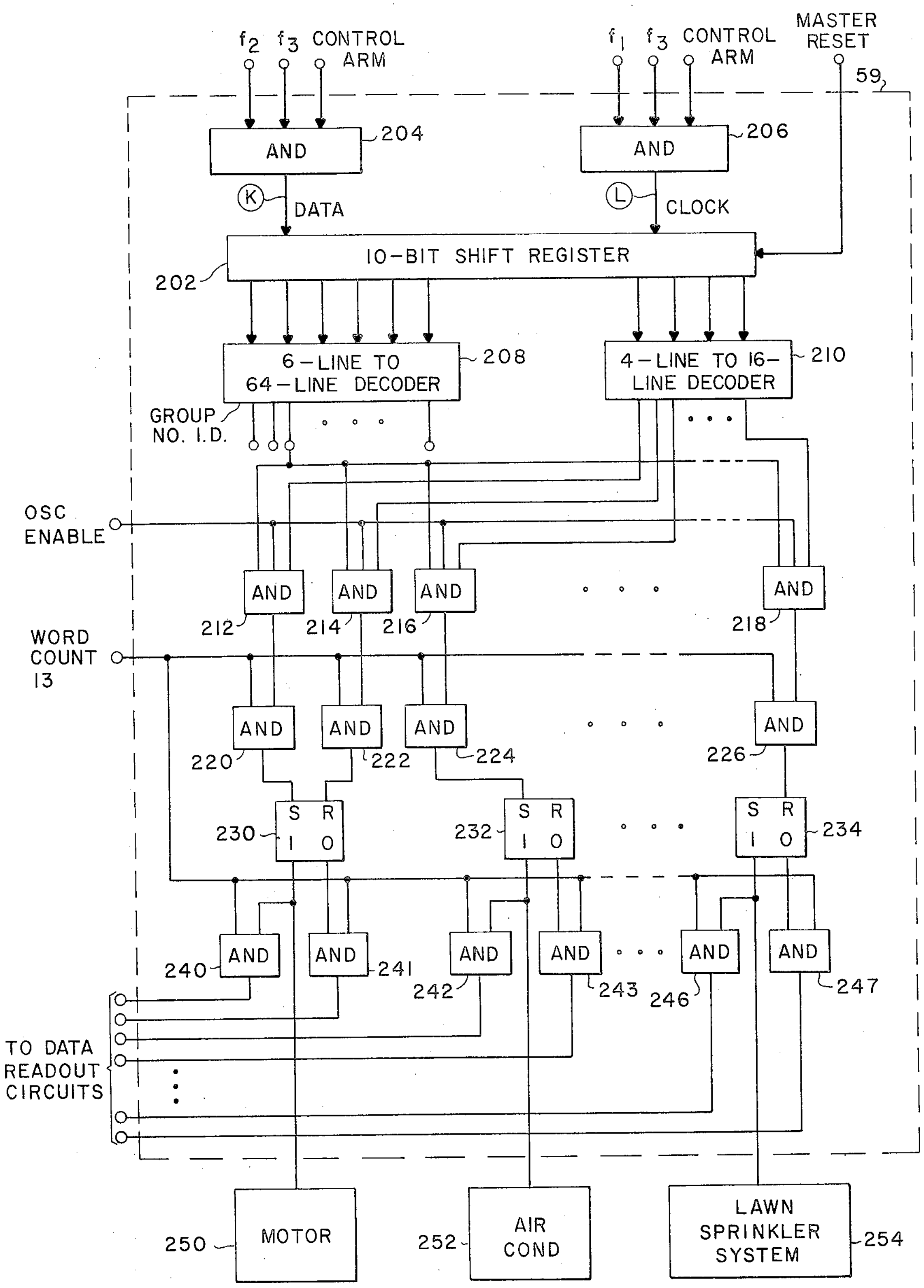
FIG. 11 is a more detailed block diagram of a control code decoder unit used in the FIG. 2 remote unit.

The control code decoder 59 of FIG. 2 is shown in detail in FIG. 11. As thereshown, the control code decoder 59 includes a 10-bit shift register 202 which is initially cleared or reset to zero by the master reset pulse. A received control code word is read into the shift register 202 in a serial manner by way of AND circuit 204. Clock pulses for clocking in the word are provided by an AND circuit 206. AND circuits 204 and 206 are activated to supply data pulses and clock pulses to the shift register 202 only when the word count decoder 60 is supplying the "control arm" signal to the AND circuits. As indicated in the FIG. 3 chart, AND circuit 206 produces an output clock signal (represented by waveform L of FIG. 5) only when $f_1$ and $f_3$ signals (also the "control arm" signal) are at the binary one level. AND circuit 204 produces a binary one signal (represented by waveform K of FIG. 5) only when the $f_2$ and $f_3$ signals (also the "control arm" signal) are at the binary one level. Just as with the ID data, since the $f_3$ signal is always at the binary one level during interval V, the $f_1$ signal pulses can be thought of as clock pulses and the $f_2$ signals can be thought of as the control code signals.

Six of the binary output lines of the shift register 202 are connected to a 6-line to 64-line decoder 208, whereas the remaining four binary output lines are connected to a 4-line to 16-line decoder 210. The six lines connected to the decoder 208 specify the cable group in which the control operation is to occur and the four lines connected to the decoder 210 represent the control operation to be performed. Thus, each of the 64 output lines of the decoder 208 may represent a different one of the cable groups so that the occurrence of a binary one level at a particular one of these output lines specifies the group identified by the received control code word. A first input to each of a series of AND circuits 212, 214, 216, . . ., and 218 is connected (e.g., by patchboard type interconnection) to the decoder 208 output line representing the group to which the remote unit in question belongs. In FIG. 11, the third decoder 208 output line from left is shown connected to the first input to the AND circuits 212, 214, 216, . . ., and 218.

Each of the sixteen output lines of the decoder 210 represent a different control operation which is to be performed at the remote unit designated by the ID number and group number identification. Each of these output lines are connected to a second input of a different one of the AND circuits 212, 214, 216, . . ., and 218. A third input to the AND circuits 212, 214, 216, . . ., and 218 is the "oscillator enable" signal derived from the I.D. decoder 61 in FIG. 2. A particular one of the AND circuits 212, 214, 216, . . ., and 218 is enabled (generates a binary one output signal) when all three inputs thereto are at the binary one level. Thus, if the remote unit of FIGS. 2 and 11 is the one designated by the transmitted group number identification and remote unit I.D. number, then the decoder 208 will apply a binary one signal to each of the AND circuits 212, 214, 216, . . ., and 218 and the binary one "oscillator enable" signal will also be applied to these AND circuits. The particular AND circuit enabled is then determined by the control operation to be performed, sic, by the output of decoder 210.

The output of each of the AND circuits 212, 214, 216, . . ., and 218 is connected to a first input of a different one of AND circuits 220, 222, 224, . . ., and 226. A second input of each of the latter AND circuits is connected to the word 13 output line of the word count decoder 60. Word count 13 is utilized to initiate the control operation. Thus, each time a control operation is to be initiated, thirteen word count pulses are transmitted during interval VI to initiate the operation. If no control operation is to be initiated, then less than thirteen word count pulses will be transmitted during interval VI. Application of the "word thirteen" signal to the AND circuits 220, 222, 224, . . ., and 226 enables one of the AND circuits causing it to apply a binary one signal to a corresponding one of the flip-flop 230, 232, . . ., or 234. The specific AND circuit enabled designates the control operation to be performed. For example, if AND circuit 220 were enabled, then flip-flop 230 would be set resulting in a signal being applied to a motor 250. This signal might illustratively be for operating a relay in the motor to turn it on. Removal of this signal to turn the motor off would be effected by enabling AND circuit 222 which would cause the flip-flop 230 to reset. Other control operations, such as turning an air conditioner on and off or turning a lawn sprinkler system on and off, would be carried out in similar fashion.

To provide feedback information to the master station that the control operation has been initiated, AND circuits 240, 241, . . ., and 247 have been provided. When any of the flip-flops 230, 232, . . ., or 234 are set or reset, a corresponding one of the AND circuits 240, 241, . . ., or 247 generates a binary one signal which is the data readout circuits 62 of FIG. 2. As shown in detail in FIG. 8, each output line of the AND circuits 240, 241, . . ., and 247 is connected to a different combination of the OR circuits 101–116. Thus, each time a control operation is properly initiated, a serial data signal is generated by the data bit selector 117 which identifies the control operation initiated. If either no serial data signal is generated (i.e., data out of data bit selector 117 are all binary zeros) when a control operation is supposed to have been initiated or if an incorrect serial data signal is generated which identifies a control operation different from the one which should have been initiated, then the master station will "know" something is wrong and some type of corrective action may be taken. The charts in FIGS. 4 and 5 indicate that when word 13 is generated, the reply data provides a check on the control operation initiated at the remote unit. Each of the "C's" in the "word 13" bit positions represent either a binary one or zero depending upon the combination of OR circuits 101–116 enabled during the readout interval VII.

Referring back to FIG. 1, there will now be considered a further feature of the present system. In particular, the present system enables a portable type television camera and transmitter unit 150 to be connected to the cable network 16 at the site of any of the various remote units. Such television transmitter 150 is constructed to transmit television signals in the same frequency range as is used for the remote unit reply signals. In the present example, this would be the 5 to 30 megahertz frequency range. Depending upon the quality of the television signal to be transmitted, the signal bandwidth of the transmitter 150 will be somewhere on the order of 2 to 6 megahertz. Since the bandwidth of the reply signal range is 25 megahertz, this remote location originated television signal can be readily accommodated in such bandwidth along with the various remote unit reply signals.

The remote location originated television signal from transmitter 150 is transmitted by way of the cable network 16 back to the master staiton 12. At the master station 12, it is detected by a video signal detector 151. Such detector 151 includes the necessary band-pass filter circuitry for separating the remote location television signal from the remainder of the signals on the cable. The separated and detected remote originated television signal is then supplied to a television transmitter 152 for purposes of retransmitting such television signal in the same frequency range as used by the television program source transmitter 21. This enables all of the various remote subscriber units to receive and display the television program produced by the portable transmitter 150. Thus, the present cable television communications system further provides an advantageous mechanism for obtaining television signals from a remote location and rebroadcasting same to a relatively large television viewing audience.

While there has been described what is considered to be a good, practical working example of this invention, it is to be clearly understood that various changes and modifications may be readily made therein without departing from the invention. For example, more than the three $f_1$, $f_2$ and $f_3$ interrogation and control signals could, if desired, be utilized for interrogation and control purposes. Furthermore, the values of the frequencies used may be any of a large variety of values. As already indicated, such signals may be any three frequencies which can be detected as fundamental frequencies or, if desired, can be heterodyned signals obtained by mixing three fundamental frequencies with a common carrier or sub-carrier frequency. Also, if desired, frequency shift keying can be employed. The primary criteria is to employ distinctive interrogation and control signals which can be transmitted in a simultaneous and independent manner and which can be subsequently separated and individually reproduced at each of the remote units.

It should be further noted that the signal formats set forth in FIGS. 3 and 4 are good typical working examples, but are not to be taken as all inclusive of the formats that can be used with the present invention. Similar considerations apply to the waveforms of FIG. 5. In particular, the format shown in FIG. 5 may be readily expanded to include an additional number of identification code bits in interval III, an additional number of control code bits in interval V, an additional number of function selector bits in interval VI, or an additional number of data bits in readout interval VII. If desired, parity signals can be added to either the identification code or control code signals transmitted by the master station or to the data reply signals transmitted by the remote unit. In the latter case, one of the bits 1 through 16 might be used for parity purposes. Alternatively, one or more additional bits may be added to the reply data for parity purposes.

With respect to the function selector or word count decoder 60 of FIG. 6, the 4-bit counter 63 and the 4-line to 16-line decoder 64 can be expanded to form an X-bit counter and an X-bit to Y-bit decoder, where X and Y may be assigned the desired values. With respect to the ID decoder 61 shown in FIG. 7, the shift register 68 and the decoders 71, 72 and 73 may be expanded to accommodate a greater number of identification code bits. Also, the output AND gate 81 may be expanded to have a larger number of input lines in the event the increased number of identification code bits should require same. The control code decoder 59 shown in FIG. 11 could be similarly expanded.

With respect to FIG. 8, the various mechanical switches thereshown (switches in units 89, 90 and 92) are intended by way of example only. Such switches may instead take the form of various known types of electronic switch circuits and logic circuits, such as those which employ transistors or semiconductor switching devices. In other words, any form of data transducer device or circuit can be employed which enables the recognition of the desired binary zero and binary one conditions. Also, with respect to FIG. 8, the data bit selector 117 and the number of OR gates 101–116 are expandable to accommodate a greater number of data bits in the reply signal.

With respect to FIG. 9, the opinion or viewer response circuits 91 thereshown are not limited to merely indicating a yes, no, or no opinion type response. They can instead be used to represent an A, B, C type or 1, 2, 3 type response to multiple choice type questions and the like. Also, the response circuits 91 can be expanded to accommodate more than three possible responses.

Figure 10:
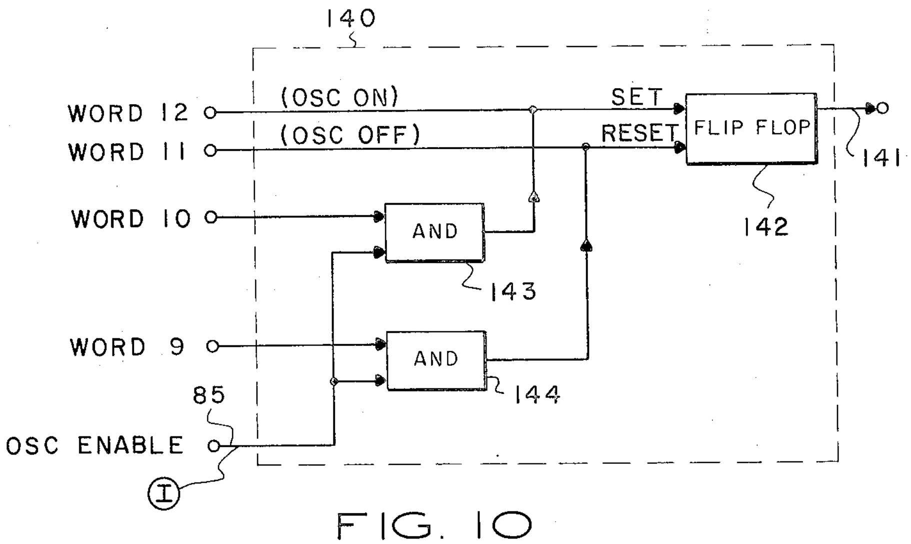
FIG. 10 is a more detailed block diagram of certain test circuits which may be used in the FIG. 2 remote unit.

With respect to FIG. 10, the test circuits thereshown are expandable to include enable control, disable control and override condition type operating functions.

While there have been described what are at present considered to be preferred embodiments of this invention, it will be obvious to those skilled in the art that various further changes and modifications may be made therein without departing from the invention, and it is, therefore, intended to cover all such changes and modifications as fall within the true spirit and scope of the invention.

What is claimed is:

1. A communications system comprising:
a master station comprising:
transmitter means for simultaneously transmitting a plurality of interrogation signals each at a different frequency;
receiver means for receiving reply signals;
means for producing a train of clock pulses;
means for producing binary control signals;
and modulator means for modulating the interrogation signal at one of the frequencies with said train of clock pulses and the interrogation signals at the other frequencies with said binary control signals;
and a remote unit for receiving signals transmitted by the master station and comprising
transmitter means for transmitting serial data bit signals back to the master station;
frequency selective detector means responsive to received master station interrogation signals for individually reproducing the clock pulses and the binary control signal;
and control circuit means responsive to the reproduced clock pulses for controlling the timing of the data bits and the transmitted reply signals.

2. A communications system comprising:
a master station comprising:
transmitter means for transmitting interrogation signals at a plurality of different frequencies;
receiver means for receiving reply signals; and
modulator means for modulating the interrogation signals to produce a master reset signal pattern at recurrent time intervals in the interrogation signals;
and a remote unit for receiving signals transmitted by the master station and comprising:
transmitter means for transmitting reply signals back to the master station;
frequency selective detector means responsive to the received master station interrogation signals for producing control signals in response thereto;
and control circuit means responsive to the control signals produced by the detector means for controlling the operation of the remote unit transmitter means, said remote unit control circuit including reset circuit means responsive to the control signals produced by the remote unit detector means for detecting the occurrence of a master reset signal pattern and resetting the remote unit control circuit means.

3. A communications system in accordance with claim 2 wherein:
the master station modulating means includes means for producing control code signal patterns at recurrent time intervals in the interrogation signals, said control code signal patterns representing different code values;
the remote unit includes a plurality of control mechanisms, each such mechanism being responsive to one or more operation control signals for performing a certain operation, each such operation control signal corresponding to a different one of said code values;
and decoder means responsive to the control signals produced by the frequency selective detector means for determining the code value of a received control code signal pattern and generating the corresponding operation control signal.

4. A communications system in accordance with claim 3 wherein:
the decoder means includes means for producing a monitor signal each time an operation control signal is generated, said monitor signal identifying the generated operation control signal;

and the control circuit means further includes readout circuit means for controlling the signals transmitted by the remote unit transmitter means in accordance with the monitor signals produced.

5. A communications system comprising:

a master station including transmitter means for transmitting interrogation signals having remote unit identification signal patterns and control signal patterns at recurrent time intervals therein;

a plurality of remote units for receiving signals transmitted by the master station, each comprising:

first decoder means responsive to the received master station interrogation signals for detecting the occurrence of a certain identification signal pattern therein and for generating an enabling signal upon such detection, the identification signal pattern detected by the first decoder means being different from the identification signal patterns detected by the first decoder means of any other remote unit;

one or more control mechanisms;

and second decoder means including means responsive to the received master station interrogation signals for generating operation control signals corresponding to the control signal pattern in the received interrogation signals and means responsive to said enabling signal for applying said operation control signals to selected ones of said control mechanisms specified by the applied operation control signals.

6. A communications system comprising:

a master station comprising:

transmitter means for transmitting interrogation signals;

modulator means for modulating the interrogation signals for producing function selector signal patterns at recurrent time intervals therein and for enabling such function selector signal patterns to represent different code values;

and receiver means for receiving reply signals;

and a remote unit for receiving signals transmitted by the master station and comprising:

transmitter means for transmitting reply signals back to the master station;

a plurality of data transducer means for producing a plurality of different data signals, each such transducer means having a different function selector code value assigned thereto;

and decoder means responsive to the received master station interrogation signals for determining the code value of a received function selector signal pattern and enabling the corresponding one of the data transducer means to control the operation of the remote unit transmitter means.

7. A communications system in accordance with claim 6 wherein:

the remote unit includes test circuit means for causing the remote unit transmitter means to assume a predetermined test condition;

and the remote unit decoder means is further responsive to the received interrogation signals for enabling operation of the test circuit means following receipt of a predetermined function selector signal pattern which is different from those employed for the data transducer means.

8. A communications system comprising:

a master station comprising:

transmitter means for transmitting parallel interrogation signals at a plurality of different frequencies;

and modulator means for individually modulating the interrogation signals at the different frequencies for producing a serial sequence of signal period each having a remote unit identification code interval, a function selector code interval and a data readout control interval; and receiver means for receiving reply signals;

and a remote unit for receiving signals transmitted by the master station and comprising:

transmitter means for transmitting reply signals back to the master station;

a plurality of data transducer means for producing a plurality of different data signals, each such transducer means having a different function selector code value assigned thereto frequency selective detector means responsive to the received master station interrogation signals for producing parallel control signals in accordance with the modulation of the individual ones of the parallel interrogation signals;

identification decoder means responsive to the control signals for detecting the occurrence of a unique identification code pattern during an identification code interval and thereafter generating an enabling signal for enabling the remote unit transmitter means;

function selector decoder means responsive to the control signals for determining the selector code value during the following function selector code interval and enabling the corresponding one of the data transducer means;

and data readout circuit means responsive to the control signals during the following data readout control interval for controlling the operation of the remote unit transmitter means in accordance with the data condition of the selected data transducer means for causing the remote unit transmitter means to transmit corresponding data signals back to the master station.

9. A communications system in accordance with claim 8 wherein:

the master station modulator means includes means for producing a serial sequence of signal periods each further having a control code interval;

and the remote unit includes control code decoder means responsive to the control signals for producing an operation control signal specified by the control code value during the control code interval, and a control mechanism responsive to said operation control signal for carrying out a certain operation.

10. A communications system in accordance with claim 8 wherein the master station modulator means includes means for producing a serial sequence of signal periods wherein said remote unit identification code interval and said function selector code interval precede said data readout control interval in each period and wherein said signal period each further has an interval following said ID code interval and function selector code interval and preceding said data readout control interval in which the interrogation signals are not modulated.

11. A communications system in accordance with claim 8 wherein the master station modulator means includes means for producing data bit intervals of a first duration in said remote unit identification code intervals and said function selector code intervals, and for producing data bit intervals of a second duration, longer than said first duration, in said data readout control intervals.

12. A communications system in accordance with claim 8 wherein:
the master station transmitter means includes means for simultaneously transmitting three interrogation signals at three different frequencies;
the master station modulator means includes means for modulating the interrogation signal at one of the frequencies with a train of clock pulses and the interrogation signals at the other two frequencies with binary control signals;
the remote unit transmitter means includes means for transmitting serial data bit signals back to the master station;
the remote unit frequency selective detector means includes means for individually reproducing the clock pulses and the binary control signals as different ones of the parallel control signals;
and the remote unit data readout circuit means includes means responsive to the reproduced clock pulses for controlling the timing of the data bits in the transmitted reply signals.

13. A communications system in accordance with claim 8 wherein:
the master station modulator means includes digital data processor means;
the remote unit transmitter means comprises means for transmitting reply signals in the form of digital data signals;
and the master station includes receiver means for receiving the remote unit data signals and supplying same to the digital data processor means.

14. A communications system in accordance with claim 8 wherein:
the master station modulator means includes means for producing a master reset signal pattern during each signal period;
and the remote unit includes reset circuit means responsive to the control signals for resetting the identification decoder means, the function selector decoder means and the data readout circuit means.

15. A communications system in accordance with claim 8 wherein:
the remote unit further includes test circuit means for causing the remote unit transmitter means to assume a predetermined test condition;
and the function selector decoder means is further responsive to the control signals for enabling operation of the test circuit means following receipt of a predetermined function selector code value which is different from the function selector code values for the data transducer means.

16. A communications system in accordance with claim 8 and including a plurality of separate remote units each constructed in accordance with the remote unit defined in claim 15 with the exception that the identification decoder means in the different remote units are constructed to detect the occurrence of different identification code patterns.

17. A cable television communications system comprising
a master station, a plurality of remote subscriber units and a cable network for coupling the remote subscriber units to the master station wherein:
the master station comprises:
television signal transmitter means for transmitting television signals in a first frequency range;
interrogation signal transmitter means for simultaneously transmitting three interrogation signals at different frequencies in a second frequency range;
means for producing a train of clock pulses;
means for producing binary control signal;
modulator means for modulating the interrogation signal at one of the frequencies with said train of clock pulses and the interrogation signals at the other two frequencies with said binary control signals;
and receiver means for receiving reply signals in a certain frequency range;
and each remote subscriber unit comprises:
television receiver means responsive to the transmitted television signals for reproducing television programs at the remote unit location;
reply signal transmitter means for transmitting serial data bit signals back to the master station in the third frequency range;
frequency selective detector means for individually reproducing the clock pulses and the binary control signals;
and control circuit means responsive to the reproduced clock pulses for controlling the timing of the data bits in the transmitted reply signals.

18. A cable television communications system comprising:
a master station, a plurality of remote subscriber units and a cable network for coupling the remote subscriber units to the master station wherein:
the master station comprises:
television signal transmitter means for transmitting television signals in a first frequency range;
interrogation signal transmitter means for transmitting interrogation signals in a second frequency range;
modulator means for modulating the interrogation signals for producing a serial sequence of signal period each having a remote unit identification code interval, a function selective code interval and a data readout control interval;
and receiver means for receiving reply signals in a third frequency range;
and each remote subscriber unit comprises:
television receiver means responsive to the transmitted television signals for reproducing television programs at the remote unit location;
reply signal transmitter means for transmitting reply signals back to the master station in the third frequency range;
a plurality of data transducer means for producing a plurality of different data signals, each such transducer means having a different function selector code value assigned thereto;
identification decoder means responsive to the received master station interrogation signals for detecting the occurrence of a unique identification code pattern during an identification code interval, the pattern for each remote unit being different and thereafter producing an enabling signal for enabling its reply signal transmitter means;

function selector decoder means responsive to the received master station interrogation signals for determining the function selector code value during the following function selection code interval and enabling the corresponding one of the data transducer means;

and data readout circuit means responsive to the received master station interrogation signals during the following data readout control interval for controlling the operation of its reply signal transmitter means in accordance with the data condition of the selected data transducer means for causing the reply signal transmitter means to transmit the secected data signal back to the master station.

19. A cable television communications system in accordance with claim 18 wherein:

the master station includes modulator means for modulating the interrogation signals for producing a serial sequence of signal periods each further having a control code interval;

the function selector decoder means includes means for producing a function selector signal in response to certain received master station interrogation signals;

and at least one of said remote units further includes:

one or more control mechanisms;

and control code decoder means comprising means responsive to the received master station interrogation signals for determining the control code value during the control code interval and for generating a corresponding operation control signal, and means responsive to the coincident production of said enabling signal and said function selector signal for applying said operation control signal to one of said control mechanisms specified by the applied operation control signal.

20. A cable television communications system in accordance with claim 18 wherein:

the control code decoder means further include means for producing a monitor signal each time an operation control signal is applied to a control mechanism said monitor signal specifying the operation control signal so applied;

and the data readout circuit means includes means for causing the reply signal transmitter means to transmit said monitor signal back to the master station.

21. A remote unit for use in a communications system wherein a master station transmits parallel interrogation signals at a plurality of different frequencies and such signals are individually modulated to provide a serial sequence of signal periods each having a remote unit identification code interval, a function selector code interval and a data readout control interval, such remote unit comprising:

transmitter means for transmitting reply signals back to the master station;

a plurality of data transducer means for producing a plurality of different data signals, each such transducer means having a different function selector code value assigned thereto;

frequency selective detector means responsive to the received master station interrogation signals for producing parallel control signals in accordance with the modulation of the individual ones of the parallel interrogation signals;

identification decoder means responsive to the control signals for detecting the occurrence of a unique identification code pattern during an identification code interval and thereafter enabling the remote unit transmitter means;

function selector decoder means responsive to the control signals for determining the selector code value during the following function selector code interval and enabling the corresponding one of the data transducer means;

and data readout circuit means responsive to the control signals during the following data readout control interval for controlling the operation of the remote unit transmitter means in accordance with the data condition of the selected data transducer means for causing the remote unit transmitter means to transmit corresponding data signals back to the master station.

22. A remote unit for use in a communications system wherein a master station transmits interrogation signals having control code signal patterns at recurrent time intervals therein, such remote unit comprising:

decoder means responsive to the received master station interrogation signals for generating operation control signals corresponding to the code values of the received control code signal pattern;

a plurality of control mechanisms each responsive to different ones of said operation control signals for performing certain predetermined operations;

and said decoder means comprising:

a multiple-stage shift register;

logic circuit means responsive to the master station interrogation signals for applying to said shift register data representing a received control code signal pattern;

first decoder means coupled to a first group of the shift register stages and having a plurality of output lines and including means responsive to the data condition in such first group of shift register stages for activating only a particular one of such output lines;

second decoder means coupled to a second group of the shift register stages and having a plurality of output lines and including means responsive to the data condition in such second group of shift register stages for activating only a particular one of the output lines;

and second logic circuit means coupled to a selected output line from said first decoder means and to said output lines of said second decoder means and having a plurality of output lines each corresponding to a different one of the output lines of said second decoder means and each coupled to different ones of said control mechanisms and including means responsive to the activation of the output line of said first decoder means to which said second logic circuit means is coupled and the activation of one of the output lines of said second decoder means for applying an operation control signal to one of the output lines of said second logic circuit means corresponding to the activated output line of said second decoder means.

* * * * *

UNITED STATES PATENT OFFICE
CERTIFICATE OF CORRECTION

Patent No. 3,803,491 Dated April 9, 1974

Inventor(s) William Osborn

It is certified that error appears in the above-identified patent and that said Letters Patent are hereby corrected as shown below:

Col. 1, line 66, delete "referecne" and substitute --reference--

Col. 6, line 57, delete "199b" and substitute --19b--

Col. 20, line 8, delete "period" and substitute -- periods--

Col. 21, line 64, delete "Claim 15" and substitute --Claim 8--

Signed and sealed this 1st day of October 1974.

(SEAL)
Attest:

McCOY M. GIBSON JR.
Attesting Officer

C. MARSHALL DANN
Commissioner of Patents

PO-1050 (10-69)

USCOMM-DC 60376-P69
U.S. GOVERNMENT PRINTING OFFICE